US009307134B2

(12) United States Patent
Ciurea et al.

(10) Patent No.: US 9,307,134 B2
(45) Date of Patent: *Apr. 5, 2016

(54) AUTOMATIC SETTING OF ZOOM, APERTURE AND SHUTTER SPEED BASED ON SCENE DEPTH MAP

(75) Inventors: Florian Ciurea, San Jose, CA (US); Gazi Ali, Santa Clara, CA (US); Alexander Berestov, San Jose, CA (US); Chuen-Chien Lee, Pleasanton, CA (US)

(73) Assignee: Sony Corporation, Tokyo (JP)

( * ) Notice: Subject to any disclaimer, the term of this patent is extended or adjusted under 35 U.S.C. 154(b) by 1156 days.

This patent is subject to a terminal disclaimer.

(21) Appl. No.: 13/072,614

(22) Filed: Mar. 25, 2011

(65) Prior Publication Data

US 2012/0242796 A1    Sep. 27, 2012

(51) Int. Cl.
H04N 13/02    (2006.01)
H04N 5/232    (2006.01)
G06T 7/00    (2006.01)
G03B 3/02    (2006.01)
H04N 13/00    (2006.01)

(52) U.S. Cl.
CPC ............ H04N 5/232 (2013.01); G06T 7/0065 (2013.01); G06T 7/0069 (2013.01); H04N 5/23212 (2013.01); G03B 3/02 (2013.01); H04N 13/0207 (2013.01); H04N 13/0239 (2013.01); H04N 13/0271 (2013.01); H04N 2013/0081 (2013.01)

(58) Field of Classification Search
CPC ...................................................... H04N 5/232
USPC .......................................................... 348/46
See application file for complete search history.

(56) References Cited

U.S. PATENT DOCUMENTS

| 6,043,900 | A  | * | 3/2000  | Feng et al. ..................... 358/1.9 |
| 6,765,618 | B1 | * | 7/2004  | Sato ....................... G03B 13/00 |
|           |    |   |         | 348/348 |
| 7,065,242 | B2 | * | 6/2006  | Petrov et al. .................. 382/154 |
| 7,262,798 | B2 |   | 8/2007  | Stavely et al. |
| 7,389,041 | B2 |   | 6/2008  | Gindele et al. |
| 7,453,456 | B2 | * | 11/2008 | Petrov et al. .................. 345/419 |
| 7,474,803 | B2 | * | 1/2009  | Petrov et al. .................. 382/285 |
| 7,711,201 | B2 | * | 5/2010  | Wong ....................... G03B 3/02 |
|           |    |   |         | 382/254 |
| 7,929,017 | B2 | * | 4/2011  | Aggarwal et al. ............. 348/169 |
| 8,027,582 | B2 | * | 9/2011  | Li ................................... 396/104 |
| 8,077,964 | B2 | * | 12/2011 | Berestov ............... G06T 7/0065 |
|           |    |   |         | 382/154 |
| 8,085,339 | B2 | * | 12/2011 | Marks ..................... H04N 5/272 |
|           |    |   |         | 348/229.1 |
| 8,229,172 | B2 | * | 7/2012  | Wong ..................... G06T 7/0069 |
|           |    |   |         | 382/106 |
| 8,233,077 | B2 | * | 7/2012  | Safaee-Rad ........... G06T 7/0069 |
|           |    |   |         | 348/349 |
| 8,260,074 | B2 | * | 9/2012  | Lin et al. ........................ 382/255 |
| 8,335,390 | B2 | * | 12/2012 | Li ............................ G06T 5/002 |
|           |    |   |         | 348/345 |

(Continued)

FOREIGN PATENT DOCUMENTS

CN         1926851 A       3/2007

OTHER PUBLICATIONS

Google Patent search log.pdf.*

(Continued)

Primary Examiner — William C Vaughn, Jr.
Assistant Examiner — Luis Perez Fuentes
(74) Attorney, Agent, or Firm — Haverstock & Owens LLP

(57) ABSTRACT

A Depth Map (DM) is able to be utilized for many parameter settings involving cameras, camcorders and other devices. Setting parameters on the imaging device includes zoom setting, aperture setting and shutter speed setting.

20 Claims, 9 Drawing Sheets

(56) References Cited

U.S. PATENT DOCUMENTS

| | | | |
|---|---|---|---|
| 8,351,685 B2 * | 1/2013 | Ho | G06T 7/0065 345/419 |
| 8,593,542 B2 * | 11/2013 | Steinberg | G06K 9/036 348/239 |
| 8,878,950 B2 * | 11/2014 | Lelescu | H04N 13/0029 348/218.1 |
| 9,077,891 B1 * | 7/2015 | Baldwin | H04N 5/23212 |
| 2005/0157204 A1 | 7/2005 | Marks | |
| 2005/0220358 A1 | 10/2005 | Blonde et al. | |
| 2007/0036427 A1 * | 2/2007 | Nakamura et al. | 382/154 |
| 2007/0274604 A1 | 11/2007 | Schechner et al. | |
| 2007/0297784 A1 | 12/2007 | Wong et al. | |
| 2008/0080852 A1 | 4/2008 | Chen et al. | |
| 2008/0232680 A1 | 9/2008 | Berestov et al. | |
| 2010/0310176 A1 * | 12/2010 | Lin et al. | 382/195 |

OTHER PUBLICATIONS

Huang et al., "Creating Depth Map From 2D Scene Classification", The 3rd International Conference on Innovation Computing Information and Control(ICICIC'08), IEEE Computer Society, pp. 1-4.

Chang et al., "View Generation for Three-Dimensional Scenes From Video Sequences", IEEE Transactions on Image Processing, vol. 6, No. 4, Apr. 1, 1997, pp. 584-598.

* cited by examiner

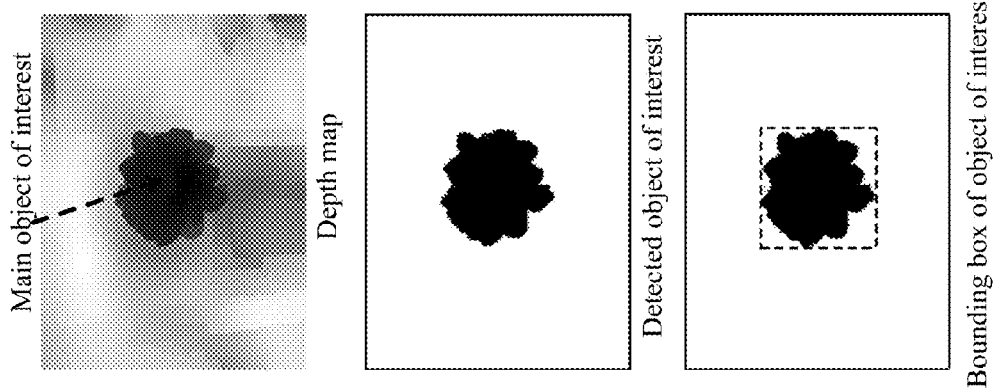
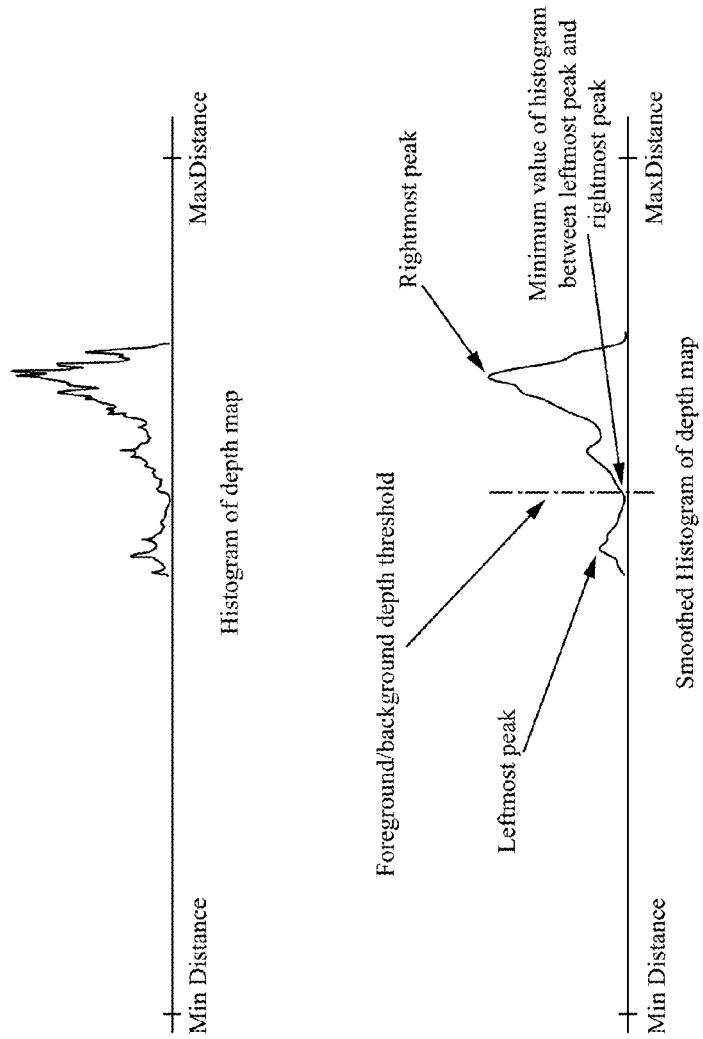
Fig. 3
Fig. 4

Main object of interest

Depth map

Final picture taken at current zoom

Final picture taken after zooming in object of interest

Initial depth map

Final depth map

Final Picture taken at current zoom

Final picture taken after zooming out

Main object of interest

Depth map

Final picture taken at current
(narrow) aperture

Final picture taken at wide aperture

AUTOMATIC SETTING OF ZOOM, APERTURE AND SHUTTER SPEED BASED ON SCENE DEPTH MAP

FIELD OF THE INVENTION

The present invention relates to the field of imaging. More specifically, the present invention relates to utilizing a depth map for setting parameters on the imaging device.

BACKGROUND OF THE INVENTION

A Depth Map (DM) is a map that associates distance from the camera sensor to a corresponding point in the scene for every single pixel. Methods of DM generation can be active: which include range sensors that use acoustic waves or project laser patterns or scan the scene with some other means to measure the distance from the camera, or passive such as stereoscopic systems, that use two or more cameras/lenses to acquire multiple images of the scene and then match them in order to triangulate the points in the scene or methods based on calculating depth from several images.

SUMMARY OF THE INVENTION

A Depth Map (DM) is able to be utilized for setting parameters on the imaging device involving cameras, camcorders and other devices. The parameters include zoom setting, aperture setting and shutter speed setting.

In one aspect, a method implemented on a device comprises generating a depth map and utilizing the depth map to configure a parameter setting on the device. The depth map is generated using a single-lens camera. The depth map is generated by receiving a first image signal with a first blur quantity at an image sensor after the first image signal passes through a lens at a first position, receiving one or more second image signals with a second blur quantity at the image sensor after the one or more second image signals pass through the lens at a second position, computing a blur difference using the first blur quantity and the second blur quantity and generating the depth map from the blur difference. The depth map is generated using at least one of: range sensors integrated with the device, double-lens stereoscopic cameras, a single-lens camera with scanning focus area, a single-lens camera utilizing an approximate depth map, a single-lens camera moved horizontally, and a movable lens and an image sensor to acquire multiple images with different blur quantities. Configuring the parameter setting includes configuring a zoom setting. Configuring the parameter setting includes configuring an aperture setting. Configuring the parameter setting includes configuring a shutter speed setting. The method further comprises classifying a scene to assist in configuring the parameter setting comprising computing a histogram of values from the depth map, smoothing the histogram to eliminate noise, detecting a leftmost peak and a rightmost peak in the smoothed histogram, if the leftmost peak and the rightmost peak correspond to depths greater than a landscape threshold, then the scene is classified as a landscape, otherwise, if a local minimum is not found between the leftmost peak and the rightmost peak, then the scene is classified as other and otherwise, otherwise, a foreground/background threshold is determined by choosing the local minimum between the leftmost peak and the rightmost peak, and pixels are classified as foreground or background based on the foreground/background threshold and a bounding box of foreground pixels determines whether there is an object of interest in the scene. The parameter setting is automatic zoom adjustment comprising classifying a scene, if the scene is classified as a landscape, incrementally zooming out of the scene and re-classifying the depth map to maintain a landscape classification and reach a widest available zoom setting, if the scene is classified as containing a main object, automatically zooming in on the object up to object boundaries of the scene, performing aperture adjustment, performing shutter speed adjustment and updating a focus position. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In another aspect, a system programmed in a controller in a device configured for utilizing a depth map in one or more applications comprises an aperture setting module configured for setting an aperture size of the device and a shutter speed setting module configured for setting a shutter speed of the device. The depth map is generated using at least one of: range sensors integrated with the device, double-lens stereoscopic cameras, a single-lens camera with scanning focus area, a single-lens camera utilizing an approximate depth map, a single-lens camera moved horizontally, and a movable lens and an image sensor to acquire multiple images with different blur quantities. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system. In some embodiments, the depth map is generated using a single-lens camera.

In another aspect, a device comprises a memory for storing an application, the application configured for generating a depth map, utilizing the depth map to configure a parameter setting on the device and a processing component coupled to the memory, the processing component configured for processing the application. The depth map is generated using at least one of: range sensors integrated with the device, double-lens stereoscopic cameras, a single-lens camera with scanning focus area, a single-lens camera utilizing an approximate depth map, a single-lens camera moved horizontally, and a movable lens and an image sensor to acquire multiple images with different blur quantities. Utilizing the depth map to configure the parameter setting includes at least one of configuring a zoom setting, configuring an aperture setting and configuring a shutter speed setting. The application is further configured for classifying a scene to assist in configuring the parameter setting comprising computing a histogram of values from the depth map, smoothing the histogram to eliminate noise, detecting a leftmost peak and a rightmost peak in the smoothed histogram, if the leftmost peak and the rightmost peak correspond to depths greater than a landscape threshold, then the scene is classified as a landscape, otherwise, if a local minimum is not found between the leftmost peak and the rightmost peak, then the scene is classified as other and otherwise, a foreground/background threshold is determined by choosing the local minimum between the leftmost peak and the rightmost peak, and pixels are classified as foreground or background based on the foreground/background threshold and a bounding box of foreground pixels determines whether there is an object of interest in the scene. The parameter setting is automatic zoom adjustment comprising classifying a scene, if the scene is classified as a landscape, incrementally zooming out of the scene and re-classifying the depth map to maintain a landscape classification and reach a widest available zoom setting, if the scene is classified as containing a main object, automatically zooming in on the object up to object boundaries of the scene, performing aperture adjustment, performing shutter speed adjustment and updating a focus position. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system. The device is a digital still camera.

In yet another aspect, a camera device comprises an image acquisition component, a memory for storing an application, the application configured for generating a depth map, utilizing the depth map to configure a parameter setting on the device for acquiring an image with the image acquisition component and a processing component coupled to the memory, the processing component configured for processing the application. The depth map is generated using at least one of: range sensors integrated with the device, double-lens stereoscopic cameras, a single-lens camera with scanning focus area, a single-lens camera utilizing an approximate depth map, a single-lens camera moved horizontally, and a movable lens and an image sensor to acquire multiple images with different blur quantities. The application is further configured for classifying a scene to assist in configuring the parameter setting comprising computing a histogram of values from the depth map, smoothing the histogram to eliminate noise, detecting a leftmost peak and a rightmost peak in the smoothed histogram, if the leftmost peak and the rightmost peak correspond to depths greater than a landscape threshold, then the scene is classified as a landscape, otherwise, if a local minimum is not found between the leftmost peak and the rightmost peak, then the scene is classified as other and otherwise, a foreground/background threshold is determined by choosing the local minimum between the leftmost peak and the rightmost peak, and pixels are classified as foreground or background based on the foreground/background threshold and a bounding box of foreground pixels determines whether there is an object of interest in the scene. The parameter setting is automatic zoom adjustment comprising classifying a scene, if the scene is classified as a landscape, incrementally zooming out of the scene and re-classifying the depth map to maintain a landscape classification and reach a widest available zoom setting, if the scene is classified as containing a main object, automatically zooming in on the object up to object boundaries of the scene, performing aperture adjustment, performing shutter speed adjustment and updating a focus position. Utilizing the depth map to configure the parameter setting includes at least one of configuring a zoom setting, configuring an aperture setting and configuring a shutter speed setting.

BRIEF DESCRIPTION OF THE DRAWINGS

FIG. 3 illustrates a graph of a histogram and a smoothed histogram of a depth map, according to some embodiments.

FIG. 4 illustrates an example of using a depth map for generating a bounding box of an object of interest, according to some embodiments.

DETAILED DESCRIPTION OF THE PREFERRED EMBODIMENT

A Depth Map (DM) is able to be utilized for many applications involving cameras, camcorders and other devices. There are various ways of generating a DM. Some examples of methods of generating a DM include range sensors integrated with the camera, double-lens stereoscopic cameras, a single-lens camera with scanning focus area, a single-lens camera utilizing an approximate DM for auto focus, a single-lens camera moved horizontally and other implementations. Another specific implementation of determining a DM is described in U.S. patent application Ser. No. 11/473,694, entitled, METHOD OF AND APPARATUS FOR GENERATING A DEPTH MAP UTILIZED IN AUTOFOCUSING, which is incorporated by reference herein, which includes utilizing a movable lens and an image sensor. The depth information is acquired by moving the lens a short distance and acquiring multiple images with different blur quantities and then using the acquired information to compute the DM. Another implementation includes utilizing capturing and generating multiple blurred images as described in U.S. patent application Ser. No. 11/357,631, entitled, METHOD OF AND APPARATUS FOR SIMULTANEOUSLY CAPTURING AND GENERATING MULTIPLE BLURRED IMAGES, which is incorporated by reference herein. Regardless of how the DM is acquired, the applications described herein are able to utilize the DM.

A specific implementation for generating a dense depth map is described by patent application Ser. No. 12/931,293, entitled, "METHOD AND APPARATUS FOR GENERATING A DENSE DEPTH MAP USING AN ADAPTIVE JOINT BILATERAL FILTER," which is incorporated by reference herein. Such a method to generate a dense depth map is able to be used to enhance the spatial and depth resolution of an existing coarse depth map which is generally what is available from most currently available methods of DM generation.

Figure 1:
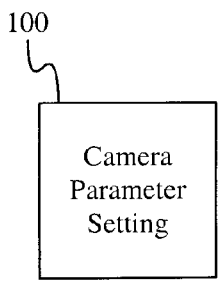
FIG. 1 illustrates a block diagram of a first stage of digital image processing in cameras and camcorders, according to some embodiments.

FIG. 1 illustrates a block diagram of a first stage of digital image processing in cameras and camcorders according to some embodiments. In the step 100, camera parameter settings are able to be configured. Examples of parameter settings include, but are not limited to, zoom setting, aperture setting and shutter speed setting. Setting the shutter speed is an indirect byproduct of the automatic zoom setting or the aperture setting. The camera parameter settings are able to benefit from the information of the DM.

Perform Scene Classification Based on DM

Figure 2:
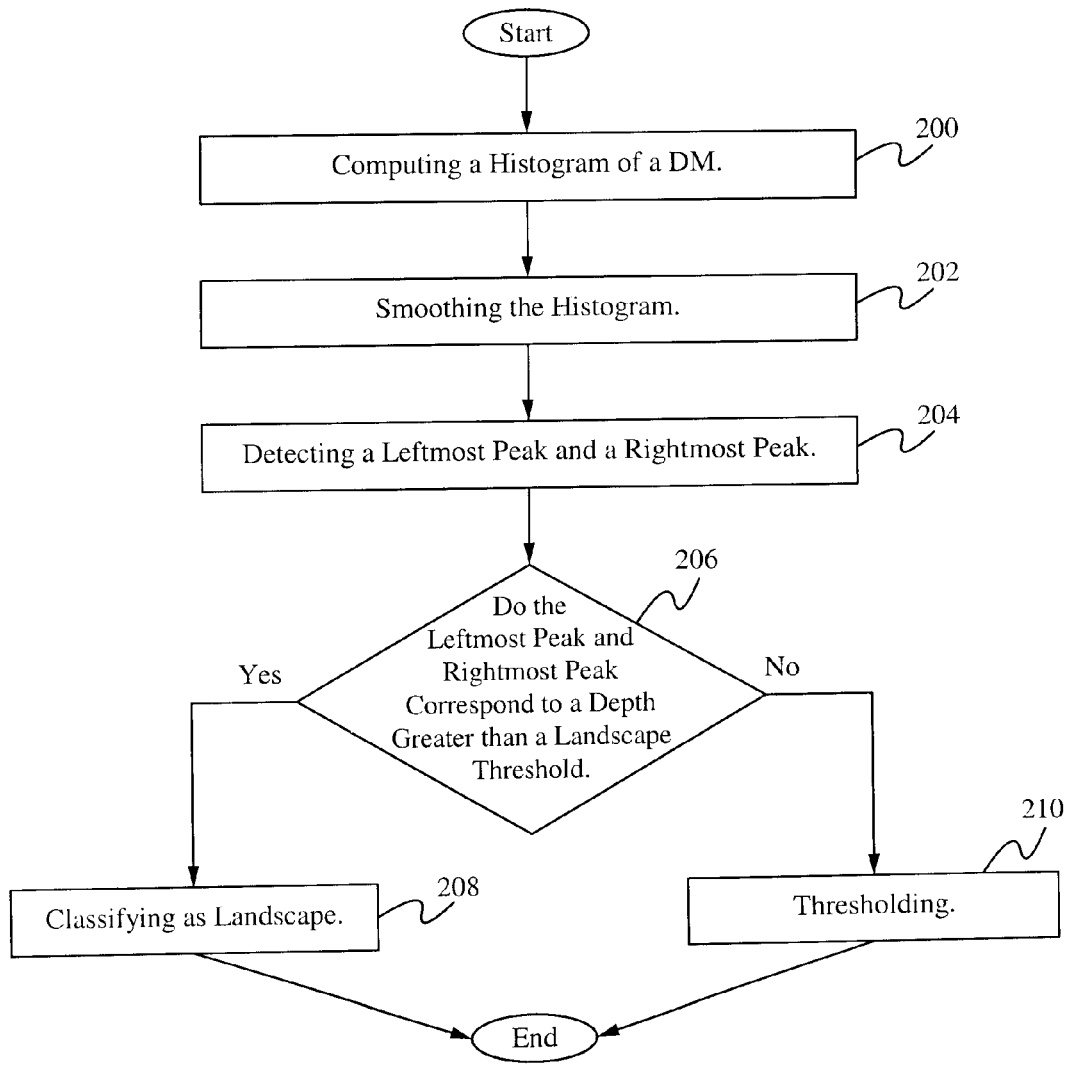
FIG. 2 illustrates a flowchart of a method of scene classification based on a depth map, according to some embodiments.

FIG. 2 illustrates a flowchart of a method of scene classification based on a depth map, according to some embodiments. In the step 200, a histogram of DM values in a DM range from 0 to MaxDistance is computed. MaxDistance is the maximum measurable distance in the depth map. This value depends on the method or device used to acquire or calculate the depth map. In the step 202, the histogram is smoothed with a 1-D Gaussian filter of large variance. The purpose of this step is to eliminate noise (little variations) in the depth map histogram. The actual variance of this filter is adjusted according to the method or device used to acquire or calculate the depth map. As an example, a variance=5 was used for histograms of 256 bins with depth map of about 400,000 pixels computed using blur difference. Any method of computing a depth map using a difference in blur is able to be used such as the method described in U.S. patent application Ser. No. 11/357,631, filed on Feb. 16, 2006 and titled, "METHOD OF AND APPARATUS FOR SIMULTANEOUSLY CAPTURING AND GENERATING MULTIPLE BLURRED IMAGES," which is incorporated by reference herein in its entirety. In the step 204, a leftmost peak and a rightmost peak are detected in the smoothed histogram of the DM. The leftmost peak in histogram corresponds to foreground area while the rightmost peak in histogram corresponds to background area. Detecting leftmost and rightmost peaks is able to be achieved by analyzing the gradient in the smoothed histogram of DM. In the step 206, if both leftmost peak and rightmost peak of the smoothed histogram correspond to depths greater than threshold_landscape, the scene is classified as a landscape in the step 208 and scene classification ends. Otherwise, the process continues looking for object of interest. In the step 210, segmentation of the object of interest is performed by thresholding. In one example of thresholding, a local minima in the smoothed histogram is found between leftmost peak and rightmost peak. If there is no local minimum, classify scene as "other" and end scene classification. If several local minima are within a certain threshold of the global minimum between the leftmost and rightmost peak, the local minimum value that corresponds to the lowest depth (this is the leftmost local minimum) is chosen. The chosen local minimum corresponds to foreground/background depth threshold. If no local minimum was found, the scene is classified as "other" and scene classification ends. Thresholding is performed on the smoothed histogram of the depth map by classifying as foreground locations with depth value lower than the threshold and classifying as background locations with depth value greater than or equal to the threshold. A bounding box of object of interest in the image is computed by looking for min x, min y, max x, max y of image locations with a depth corresponding to foreground as computed in the previous step. Although one example of thresholding is described, other implementations are possible.

Additional details of depth map thresholding of some embodiments are described herein. In the first step, a histogram H of the depth map is computed. For example, 256 bins are used. In the second step, a smoothed histogram (SH) is computed by convolving histogram H with a 1D Gaussian. For example, a 1D Gaussian with standard deviation 0.5 for histograms with 256 bins is used. SH=H$\otimes$G. In the third step, a first derivative of a smoothed histogram is computed.

For example, computing the derivative using central differences: $D(i)=[SH(i+1)-SH(i-1)]/2$. In the fourth step, the local minima and maxima in a smoothed histogram are computed by finding zero values in the first derivative. For example, $L=\{i, D(i)<tolerance\_zero\}$, where tolerance_zero is 0.02*total pixels/total_bins. In the fifth step, Leftmost_peak, Rightmost_peak and the threshold are computed. For example, Leftmost_peak=min $\{i, i\epsilon L\}$, Rightmost_peak=max $\{i, i\epsilon L\}$, threshold=$\{d, HS(d)=min \{HS(i)\}, Leftmost\_peak \leq d \leq Rightmost\_peak\}$. If no threshold satisfies the above condition, the scene does not contain an object of interest. If multiple thresholds satisfy the condition, the lowest threshold is chosen and the scene is classified as containing an object of interest.

FIG. 3 illustrates a graph of a histogram and a smoothed histogram of a depth map, according to some embodiments. In the smoothed histogram of the depth map, the leftmost peak of the histogram is the foreground area and the rightmost peak is the background. A foreground/background depth threshold is located at the minimum value of the histogram between the leftmost peak and the rightmost peak.

FIG. 4 illustrates an example of using a depth map for generating a bounding box of an object of interest, according to some embodiments. Initially, a depth map with a main object of interest and a background is shown. Then, the detected object of interest is selected and the background is removed. A bounding box of object of interest is generated around the detected object of interest.

Described herein is a method of classifying pixels in a depth map based on depth compared to a threshold level. F is a set of foreground pixels, and B is a set of background pixels.

$F=\{(x,y),DM(x,y)<threshold\}$ $B=\{(x,y),DM(x,y)\leq threshold\}$

Bounding box of an object of interest is defined by startxF, startyF, endxF, endyF:

$startxF=min\{x,(x,y)\epsilon F\}$ $startyF=min\{y,(x,y)\epsilon F\}$ $endxF=max\{x,(x,y)\epsilon F\}$ $endyF=max\{y,(x,y)\epsilon F\}$ The scene contains an object of interest if startxF>minxF and startyF>minyF and endxF<maxxF and endyF<maxyF. Otherwise, the scene does not contain an object of interest.

Automatic Zoom Adjustment

Figure 5:
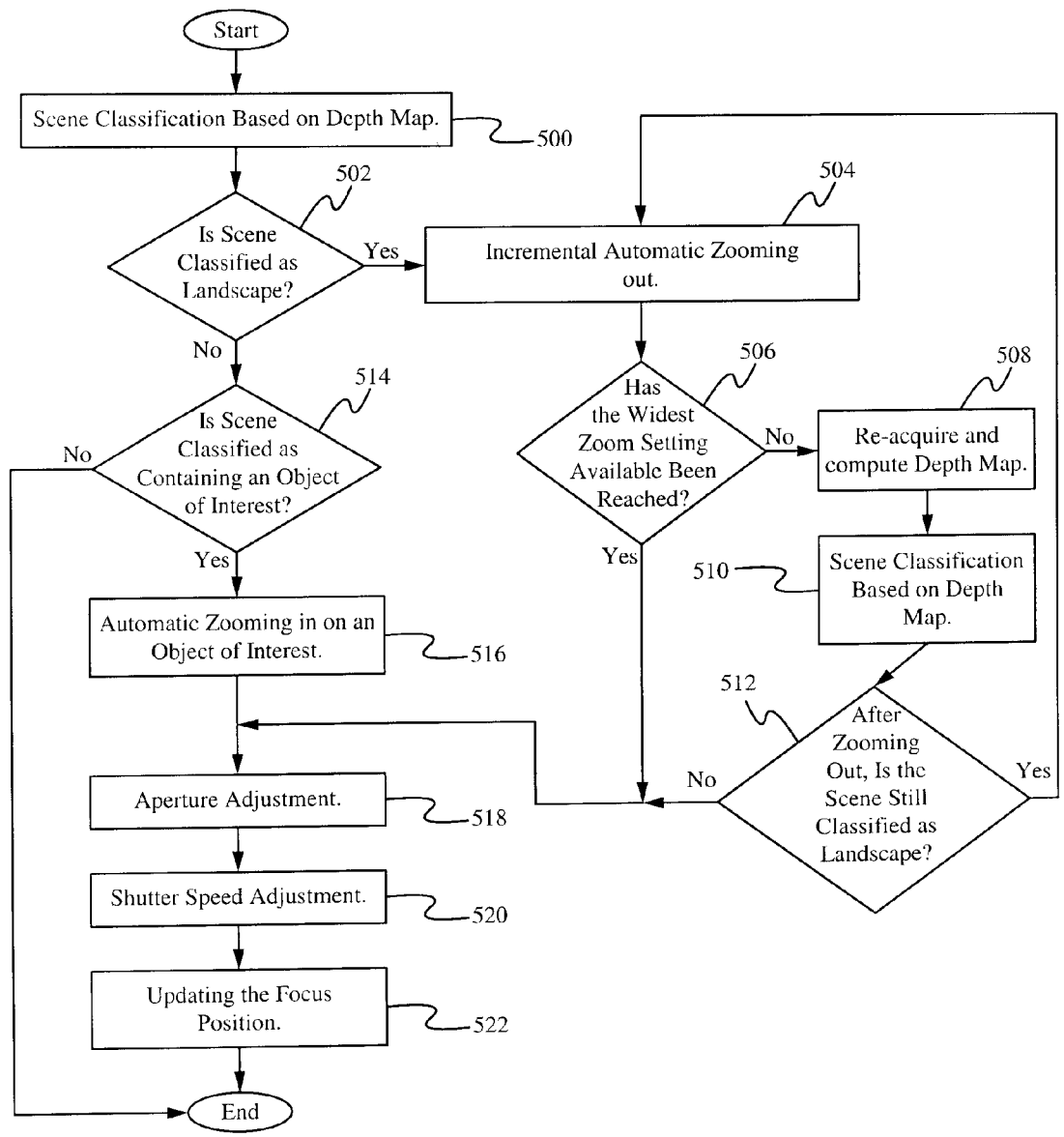
FIG. 5 illustrates a flowchart of automatic zoom setting with aperture adjustment and shutter speed adjustment, according to some embodiments.

FIG. 5 illustrates a flowchart of automatic zoom adjustment, according to some embodiments. Scene classification occurs in the step 500. Then it is determined if the scene is classified as a landscape, in the step 502. If the scene is classified as a landscape, image composition is able to be enhanced by incremental automatic zooming out, in the step 504. Since zooming out introduces new content in the scene from the periphery, zooming out is able to be performed in incremental steps while the DM is being re-classified after each step in order to ensure that scene classification as landscape is being maintained during the zooming out process. In particular, it is determined if the widest zoom setting available has been reached in the step 506. If the widest zoom setting available has been reached, then the process continues in the step 518. However, if the widest zoom setting available has not been reached, then the depth map is re-computed, in the step 508. In the step 510, scene classification based on the depth map occurs again. In the step 512, it is determined if the scene still represents a landscape. If the scene still represents a landscape, then the process resumes zooming out, in the step 504. If the scene does not represent a landscape, then the process jumps to aperture adjustment, in the step 518.

If the scene is classified as containing a main object in the step 514, image composition is able to be enhanced by automatic zooming in on the object of interest up to the object of interest boundaries in the original scene, in the step 516. After the automatic zoom adjustment process is completed, aperture adjustment is performed, in the step 518 and shutter speed adjustment is performed, in the step 520. The aperture adjustment and the shutter speed adjustment are used to compensate for changes in the widest available aperture for certain types of lenses.

After the adjustments, if the focus lens position was already computed, this focus position is able to be updated in order to reflect changes in the scene depth of field as a result of changing zoom setting, in the step 522.

Figure 6:
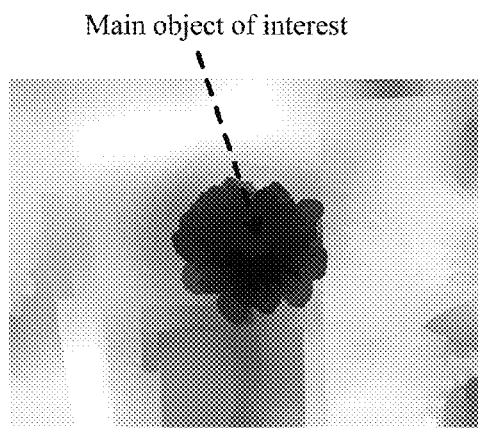
FIG. 6 illustrates an example of using a depth map for zoom setting to take a picture of a scene containing a main object of interest, according to some embodiments.
Figure 6:
Figure 6:
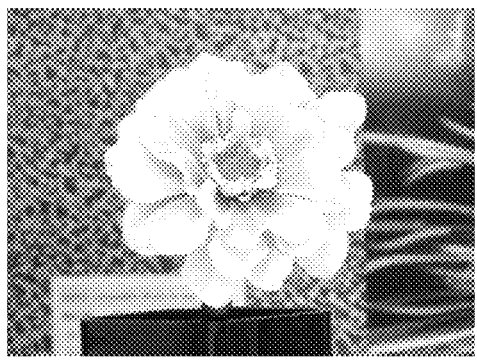

An example of automatic zoom adjustment with a main object of interest is shown in FIG. 6. In FIG. 6, the closest object and the background are determined using the DM, then zoom is able to occur when the object is the only object other than the background, so that a close-up picture is able to be taken of the object.

Figure 7:
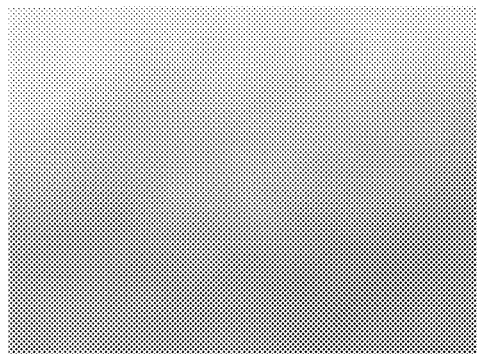
FIG. 7 illustrates an example of using a depth map for zoom setting to take a picture of a scene containing a landscape, according to some embodiments.
Figure 7:
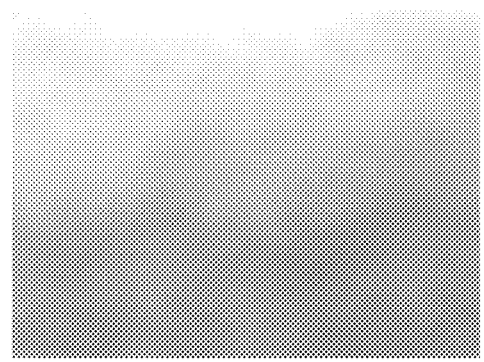
Figure 7:
Figure 7:

An example of automatic zoom adjustment with a landscape is shown in FIG. 7. An initial depth map is determined, for a picture at a current zoom, but as the process zooms out, a final depth map is generated and a final zoomed out picture is generated as described above.

Automatic Aperture/Shutter Speed Adjustment

Figure 8:
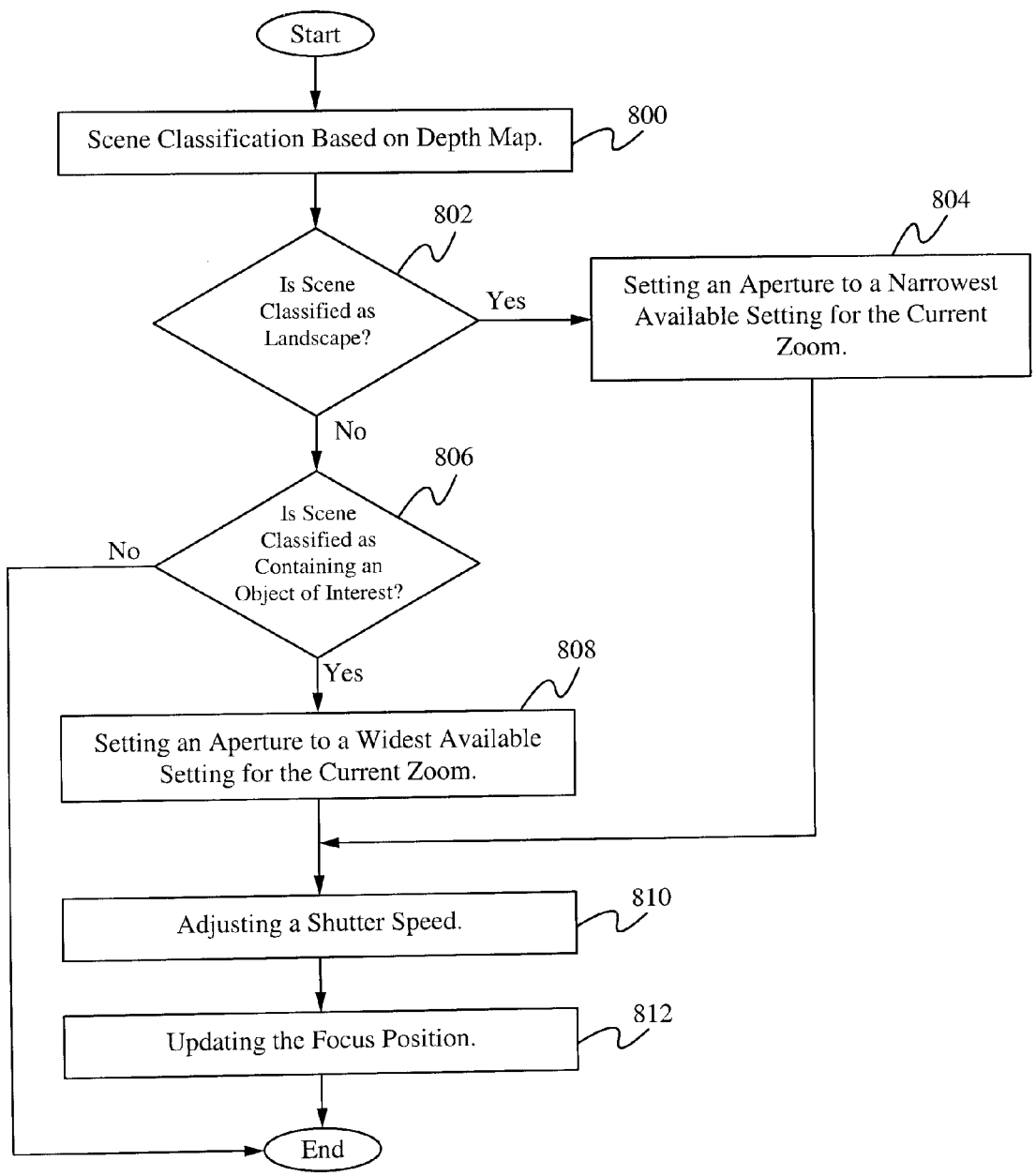
FIG. 8 illustrates a flowchart of automatic aperture setting with shutter speed adjustment, according to some embodiments.

FIG. 8 illustrates a flowchart of automatic aperture/shutter speed adjustment, according to some embodiments. In the step 800, scene classification based on a depth map occurs. If the scene is classified as representing a landscape in the step 802, image composition is able to be enhanced by automatically setting the aperture to the narrowest available setting for the current zoom position, in the step 804. The resulting image will have enhanced depth of field, suitable for landscape photography. Afterwards, the process jumps to the step 810.

If the scene is classified as containing a main object, in the step 806, image composition is able to be enhanced by setting an aperture to a widest available setting for the current zoom position, in the step 808. The resulting shallow depth of field in the final image will enhance the depth separation between the main object and the rest of the scene.

In the step 810, the shutter speed is adjusted. If the scene is classified as containing a main object of interest, then the shutter speed is increased accordingly to maintain the same exposure level for the final image. If the scene is classified as containing a landscape, the shutter speed is decreased accordingly to maintain the same exposure level for the final image.

After the automatic aperture/shutter speed adjustment process is completed, if the focus lens position was already computed, this focus position is able to be updated in order to reflect changes in the scene depth of field as a result of changing the aperture setting, in the step 812.

Figure 9:
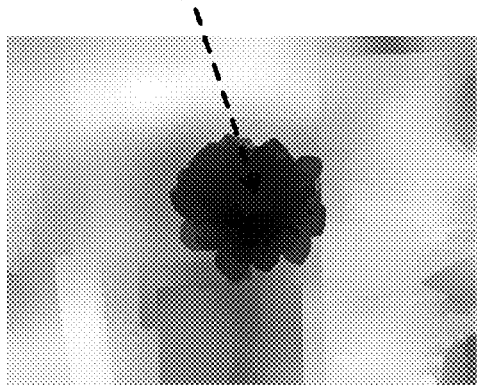
FIG. 9 illustrates an example of using a depth map for aperture setting to take a picture of a scene containing a main object of interest, according to some embodiments.
Figure 9:
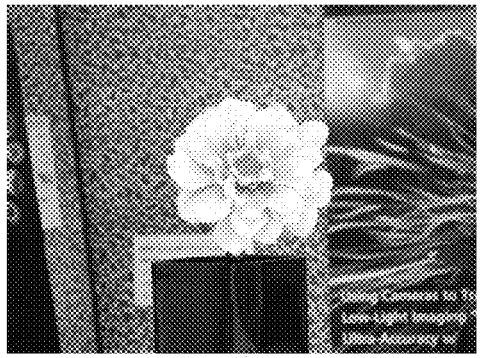
Figure 9:
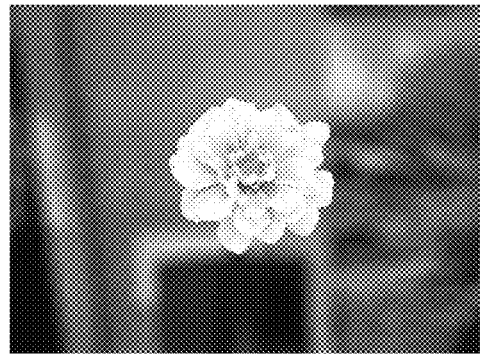

FIG. 9 illustrates an example of using a depth map for aperture setting to take a picture of a scene containing a main object of interest, according to some embodiments. In FIG. 9, the closest object and the background are determined using the DM, then aperture adjustment is able to occur when the object is the only object other than the background, so that a close-up picture is able to be taken of the object.

Figure 10:
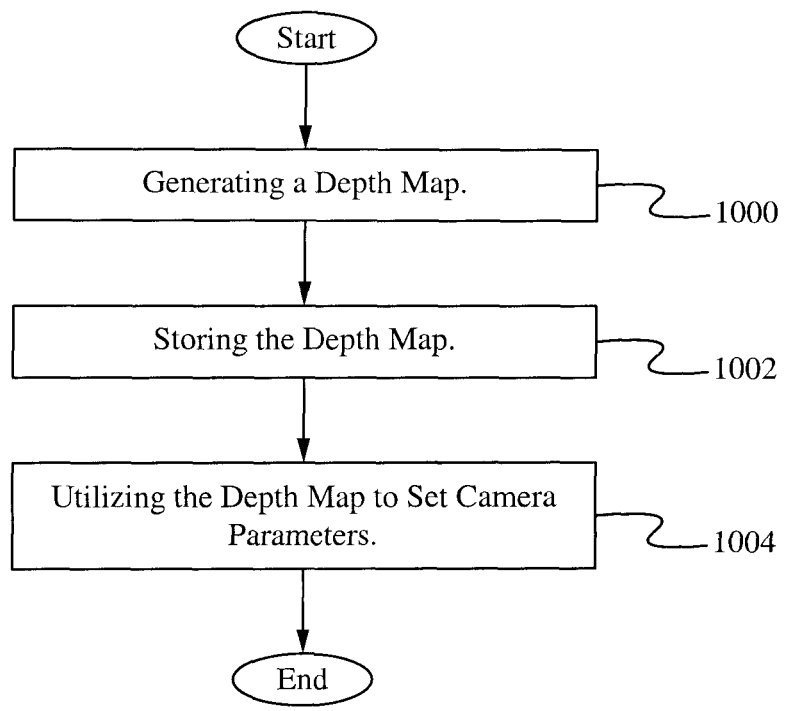
FIG. 10 illustrates a flowchart of a method of utilizing a depth map to set device parameters, according to some embodiments.

FIG. 10 illustrates a flowchart of a method of utilizing a DM to set camera parameters, according to some embodiments. In the step 1000, a DM is generated. As described above, the DM is able to be generated in a number of different ways. In the step 1002, the DM is stored. In some embodiments, the DM is copied with an image for post processing. In some embodiments, the DM is not stored and the step 1002 is able to be skipped. In the step 1004, the DM is utilized to set camera parameters such as those described above.

Figure 11:
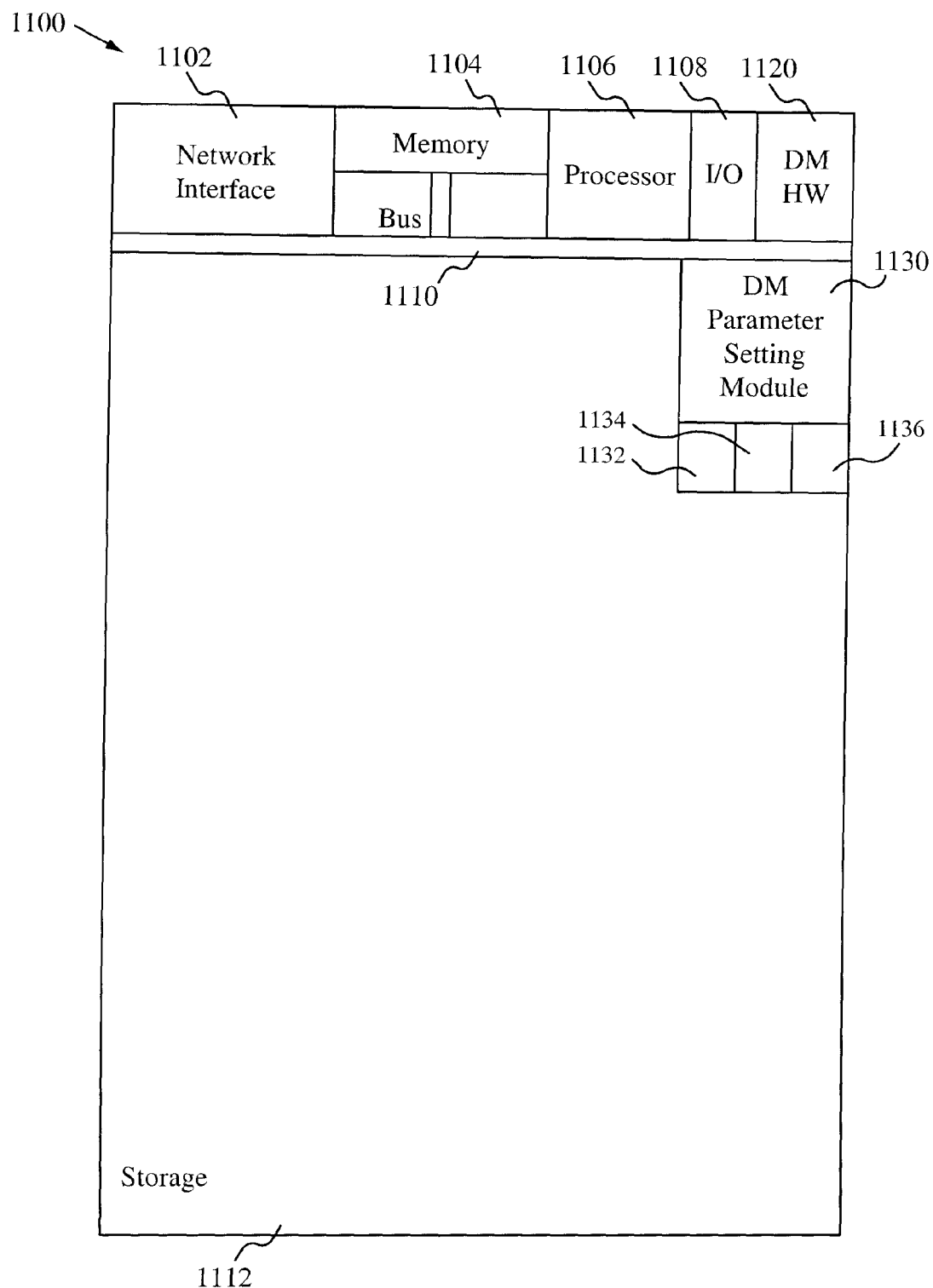
FIG. 11 illustrates a block diagram of an exemplary computing device configured to set device parameters utilizing a depth map, according to some embodiments.

FIG. 11 illustrates a block diagram of an exemplary computing device 1100 configured to implement applications utilizing a DM, according to some embodiments. The computing device 1100 is able to be used to acquire, store, compute, communicate and/or display information such as images and videos. For example, a computing device 1100 is able to acquire and store a picture. The applications utilizing the DM are able to be used in configuring the device 1100 to acquire an image, in acquiring the image or after the image is acquired. In general, a hardware structure suitable for implementing the computing device 1100 includes a network interface 1102, a memory 1104, a processor 1106, I/O device(s) 1108, a bus 1110 and a storage device 1112. The choice of processor is not critical as long as a suitable processor with sufficient speed is chosen. The memory 1104 is able to be any conventional computer memory known in the art. The storage device 1112 is able to include a hard drive, CDROM, CDRW, DVD, DVDRW, flash memory card or any other storage device. The computing device 1100 is able to include one or more network interfaces 1102. An example of a network interface includes a network card connected to an Ethernet or other type of LAN. The I/O device(s) 1108 are able to include one or more of the following: keyboard, mouse, monitor, display, printer, modem, touchscreen, button interface and other devices. DM parameter setting module(s) 1130 used to perform the DM methods are likely to be stored in the storage device 1112 and memory 1104 and processed as modules are typically processed. More or less components shown in FIG. 11 are able to be included in the computing device 1100. In some embodiments, DM processing or storage hardware 1120 is included. Although the computing device 1100 in FIG. 11 includes parameter setting modules 1130 and hardware 1120 for DM parameter setting modules, the DM parameter setting modules are able to be implemented on a computing device in hardware, firmware, software or any combination thereof.

In some embodiments, the DM parameter setting module(s) 1130 include additional modules. In some embodiments, the DM parameter setting module(s) 1130 include a zoom setting module 1132 configured for setting the zoom, an aperture setting module 1134 configured for setting the aperture size and a shutter speed setting module 1136 configured for setting the shutter speed.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television, a home entertainment system or any other suitable computing device.

Before an image/video is acquired, the DM is able to be utilized to set parameters including, but not limited to, zoom setting, aperture setting and shutter speed.

In operation, image acquisition is able to be improved by camera settings being configured appropriately before the image/video is acquired.

Some Embodiments of Automatic Setting of Zoom, Aperture and Shutter Speed Setting Based on Scene Depth Map 1. A method implemented on a device comprising:
   a. generating a depth map; and
   b. utilizing the depth map to configure a parameter setting on the device.
2. The method of clause 1 wherein the depth map is generated using a single-lens camera.
3. The method of clause 2 wherein the depth map is generated by:
   a. receiving a first image signal with a first blur quantity at an image sensor after the first image signal passes through a lens at a first position;
   b. receiving one or more second image signals with a second blur quantity at the image sensor after the one or more second image signals pass through the lens at a second position;
   c. computing a blur difference using the first blur quantity and the second blur quantity; and
   d. generating the depth map from the blur difference.
4. The method of clause 1 wherein the depth map is generated using at least one of: range sensors integrated with the device, double-lens stereoscopic cameras, a single-lens camera with scanning focus area, a single-lens camera utilizing an approximate depth map, a single-lens camera moved horizontally, and a movable lens and an image sensor to acquire multiple images with different blur quantities.
5. The method of clause 1 wherein configuring the parameter setting includes configuring a zoom setting.
6. The method of clause 1 wherein configuring the parameter setting includes configuring an aperture setting.
7. The method of clause 1 wherein configuring the parameter setting includes configuring a shutter speed setting.
8. The method of clause 1 further comprising classifying a scene to assist in configuring the parameter setting comprising:
   a. computing a histogram of values from the depth map;
   b. smoothing the histogram to eliminate noise;
   c. detecting a leftmost peak and a rightmost peak in the smoothed histogram;
   d. if the leftmost peak and the rightmost peak correspond to depths greater than a landscape threshold, then the scene is classified as a landscape;
   e. otherwise, if a local minimum is not found between the leftmost peak and the rightmost peak, then the scene is classified as other; and
   f. otherwise, a foreground/background threshold is determined by choosing the local minimum between the leftmost peak and the rightmost peak, and pixels are classified as foreground or background based on the foreground/background threshold and a bounding box of foreground pixels determines whether there is an object of interest in the scene.
9. The method of clause 1 wherein the parameter setting is automatic zoom adjustment comprising:
   a. classifying a scene;
   b. if the scene is classified as a landscape, incrementally zooming out of the scene and re-classifying the depth map to maintain a landscape classification and reach a widest available zoom setting;
   c. if the scene is classified as containing a main object, automatically zooming in on the object up to object boundaries of the scene;
   d. performing aperture adjustment;
   e. performing shutter speed adjustment; and
   f. updating a focus position.
10. The method of clause 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.
11. A system programmed in a controller in a device configured for utilizing a depth map in one or more applications comprising:
    a. an aperture setting module configured for setting an aperture size of the device; and
    b. a shutter speed setting module configured for setting a shutter speed of the device.
12. The system of clause 11 wherein the depth map is generated using at least one of: range sensors integrated with the device, double-lens stereoscopic cameras, a single-lens camera with scanning focus area, a single-lens camera utilizing an approximate depth map, a single-lens camera moved horizontally, and a movable lens and an image sensor to acquire multiple images with different blur quantities.
13. The system of clause 11 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.
14. The system of clause 11 wherein the depth map is generated using a single-lens camera.
15. A device comprising:
    a. a memory for storing an application, the application configured for:
       i. generating a depth map;
       ii. utilizing the depth map to configure a parameter setting on the device; and
    b. a processing component coupled to the memory, the processing component configured for processing the application.
16. The device of clause 15 wherein the depth map is generated using at least one of: range sensors integrated with the device, double-lens stereoscopic cameras, a single-lens camera with scanning focus area, a single-lens camera utilizing an approximate depth map, a single-lens camera moved horizontally, and a movable lens and an image sensor to acquire multiple images with different blur quantities.
17. The device of clause 15 wherein utilizing the depth map to configure the parameter setting includes at least one of configuring a zoom setting, configuring an aperture setting and configuring a shutter speed setting.
18. The device of clause 15 wherein the aperture is further configured for classifying a scene to assist in configuring the parameter setting comprising:
    a. computing a histogram of values from the depth map;
    b. smoothing the histogram to eliminate noise;
    c. detecting a leftmost peak and a rightmost peak in the smoothed histogram;
    d. if the leftmost peak and the rightmost peak correspond to depths greater than a landscape threshold, then the scene is classified as a landscape;
    e. otherwise, if a local minimum is not found between the leftmost peak and the rightmost peak, then the scene is classified as other; and f. otherwise, a foreground/background threshold is determined by choosing the local minimum between the leftmost peak and the rightmost peak, and pixels are classified as foreground or background based on the foreground/background threshold and a bounding box of foreground pixels determines whether there is an object of interest in the scene.

19. The device of clause 15 wherein the parameter setting is automatic zoom adjustment comprising:
    a. classifying a scene;
    b. if the scene is classified as a landscape, incrementally zooming out of the scene and re-classifying the depth map to maintain a landscape classification and reach a widest available zoom setting;
    c. if the scene is classified as containing a main object, automatically zooming in on the object up to object boundaries of the scene;
    d. performing aperture adjustment;
    e. performing shutter speed adjustment; and
    f. updating a focus position.

20. The device of clause 15 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

21. The device of clause 15 wherein the device is a digital still camera.

22. A camera device comprising:
    a. an image acquisition component;
    b. a memory for storing an application, the application configured for:
        i. generating a depth map;
        ii. utilizing the depth map to configure a parameter setting on the device for acquiring an image with the image acquisition component; and
    c. a processing component coupled to the memory, the processing component configured for processing the application.

23. The camera device of clause 22 wherein the depth map is generated using at least one of: range sensors integrated with the device, double-lens stereoscopic cameras, a single-lens camera with scanning focus area, a single-lens camera utilizing an approximate depth map, a single-lens camera moved horizontally, and a movable lens and an image sensor to acquire multiple images with different blur quantities.

24. The camera device of clause 22 wherein utilizing the depth map to configure the parameter setting includes at least one of configuring a zoom setting, configuring an aperture setting and configuring a shutter speed setting.

25. The camera device of clause 22 wherein the application is further configured for classifying a scene to assist in configuring the parameter setting comprising:
    a. computing a histogram of values from the depth map;
    b. smoothing the histogram to eliminate noise;
    c. detecting a leftmost peak and a rightmost peak in the smoothed histogram;
    d. if the leftmost peak and the rightmost peak correspond to depths greater than a landscape threshold, then the scene is classified as a landscape;
    e. otherwise, if a local minimum is not found between the leftmost peak and the rightmost peak, then the scene is classified as other; and
    f. otherwise, a foreground/background threshold is determined by choosing the local minimum between the leftmost peak and the rightmost peak, and pixels are classified as foreground or background based on the foreground/background threshold and a bounding box of foreground pixels determines whether there is an object of interest in the scene.

26. The camera device of clause 22 wherein the parameter setting is automatic zoom adjustment comprising:
    a. classifying a scene;
    b. if the scene is classified as a landscape, incrementally zooming out of the scene and re-classifying the depth map to maintain a landscape classification and reach a widest available zoom setting;
    c. if the scene is classified as containing a main object, automatically zooming in on the object up to object boundaries of the scene;
    d. performing aperture adjustment;
    e. performing shutter speed adjustment; and
    f. updating a focus position.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method implemented on a device comprising:
    a. generating a depth map using a single-lens camera by:
        i. receiving a first image signal with a first blur quantity at an image sensor after the first image signal passes through a lens at a first position;
        ii. receiving one or more second image signals with a second blur quantity at the image sensor after the one or more second image signals pass through the lens at a second position;
        iii. computing a blur difference using the first blur quantity and the second blur quantity; and
        iv. generating the depth map from the blur difference;
    b. configuring a parameter setting on the device based on the depth map; and
    c. classifying a scene to assist in configuring the parameter setting comprising:
        i. computing a histogram of values from the depth map;
        ii. smoothing the histogram to eliminate noise;
        iii. computing a first derivative of the smoothed histogram using central differences;
        iv. detecting a leftmost peak and a rightmost peak in the smoothed histogram;
        v. if the leftmost peak and the rightmost peak correspond to depths greater than a landscape threshold, then the scene is classified as a landscape;
        vi. otherwise, if a local minimum is not found between the leftmost peak and the rightmost peak, then the scene is classified as other; and
        vii. otherwise, a foreground/background threshold is determined by choosing the local minimum between the leftmost peak and the rightmost peak, and pixels are classified as foreground or background based on the foreground/background threshold and a bounding box of foreground pixels determines whether there is an object of interest in the scene.

2. The method of claim 1 wherein the depth map is generated using at least one of: range sensors integrated with the device, double-lens stereoscopic cameras, a single-lens camera with scanning focus area, a single-lens camera utilizing an approximate depth map, a single-lens camera moved horizontally, and a movable lens and an image sensor to acquire multiple images with different blur quantities.

3. The method of claim 1 wherein configuring the parameter setting includes configuring a zoom setting.

4. The method of claim 1 wherein configuring the parameter setting includes configuring an aperture setting.

5. The method of claim 1 wherein configuring the parameter setting includes configuring a shutter speed setting.

6. The method of claim 1 wherein the parameter setting is automatic zoom adjustment comprising:
- if the scene is classified as the landscape, incrementally zooming out of the scene and re-classifying the depth map to maintain a landscape classification and reach a widest available zoom setting;
- if the scene is classified as containing a main object, automatically zooming in on the object up to object boundaries of the scene;
- performing aperture adjustment;
- performing shutter speed adjustment; and
- updating a focus position.

7. The method of claim 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

8. A system programmed in a controller in a device configured for utilizing a depth map in one or more applications comprising:
  a. an aperture setting module configured for setting an aperture size of the device based on the depth map;
  b. a shutter speed setting module configured for setting a shutter speed of the device based on the depth map, wherein the depth map is generated using a single-lens camera by:
    i. receiving a first image signal with a first blur quantity at an image sensor after the first image signal passes through a lens at a first position;
    ii. receiving one or more second image signals with a second blur quantity at the image sensor after the one or more second image signals pass through the lens at a second position;
    iii. computing a blur difference using the first blur quantity and the second blur quantity; and
    iv. generating the depth map from the blur difference; and
  c. a classification module configured for classifying a scene to assist in configuring the aperture size and the shutter speed comprising:
    i. computing a histogram of values from the depth map;
    ii. smoothing the histogram to eliminate noise;
    iii. computing a first derivative of the smoothed histogram using central differences;
    iv. detecting a leftmost peak and a rightmost peak in the smoothed histogram;
    v. if the leftmost peak and the rightmost peak correspond to depths greater than a landscape threshold, then the scene is classified as a landscape;
    vi. otherwise, if a local minimum is not found between the leftmost peak and the rightmost peak, then the scene is classified as other; and
    vii. otherwise, a foreground/background threshold is determined by choosing the local minimum between the leftmost peak and the rightmost peak, and pixels are classified as foreground or background based on the foreground/background threshold and a bounding box of foreground pixels determines whether there is an object of interest in the scene.

9. The system of claim 8 wherein the depth map is generated using at least one of: range sensors integrated with the device, double-lens stereoscopic cameras, a single-lens camera with scanning focus area, a single-lens camera utilizing an approximate depth map, a single-lens camera moved horizontally, and a movable lens and an image sensor to acquire multiple images with different blur quantities.

10. The system of claim 8 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

11. A device comprising:
  a. a memory for storing an application, the application configured for:
    i. generating a depth map using a single-lens camera by:
      (1) receiving a first image signal with a first blur quantity at an image sensor after the first image signal passes through a lens at a first position;
      (2) receiving one or more second image signals with a second blur quantity at the image sensor after the one or more second image signals pass through the lens at a second position;
      (3) computing a blur difference using the first blur quantity and the second blur quantity; and
      (4) generating the depth map from the blur difference; and
    ii. configuring a parameter setting on the device based on the depth map;
    iii. classifying a scene to assist in configuring the parameter setting comprising:
      (1) computing a histogram of values from the depth map;
      (2) smoothing the histogram to eliminate noise;
      (3) computing a first derivative of the smoothed histogram using central differences;
      (4) detecting a leftmost peak and a rightmost peak in the smoothed histogram;
      (5) if the leftmost peak and the rightmost peak correspond to depths greater than a landscape threshold, then the scene is classified as a landscape;
      (6) otherwise, if a local minimum is not found between the leftmost peak and the rightmost peak, then the scene is classified as other; and
      (7) otherwise, a foreground/background threshold is determined by choosing the local minimum between the leftmost peak and the rightmost peak, and pixels are classified as foreground or background based on the foreground/background threshold and a bounding box of foreground pixels determines whether there is an object of interest in the scene; and b. a processing component coupled to the memory, the processing component configured for processing the application.

12. The device of claim 11 wherein the depth map is generated using at least one of: range sensors integrated with the device, double-lens stereoscopic cameras, a single-lens camera with scanning focus area, a single-lens camera utilizing an approximate depth map, a single-lens camera moved horizontally, and a movable lens and an image sensor to acquire multiple images with different blur quantities.

13. The device of claim 11 wherein utilizing the depth map to configure the parameter setting includes at least one of configuring a zoom setting, configuring an aperture setting and configuring a shutter speed setting.

14. The device of claim 11 wherein the parameter setting is automatic zoom adjustment comprising:
   if the scene is classified as the landscape, incrementally zooming out of the scene and re-classifying the depth map to maintain a landscape classification and reach a widest available zoom setting;
   if the scene is classified as containing a main object, automatically zooming in on the object up to object boundaries of the scene;
   performing aperture adjustment;
   performing shutter speed adjustment; and
   updating a focus position.

15. The device of claim 11 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

16. The device of claim 11 wherein the device is a digital still camera.

17. A camera device comprising:
   a. an image acquisition component;
   b. a memory for storing an application, the application configured for:
      i. generating a depth map using a single-lens camera by:
         (1) receiving a first image signal with a first blur quantity at an image sensor after the first image signal passes through a lens at a first position;
         (2) receiving one or more second image signals with a second blur quantity at the image sensor after the one or more second image signals pass through the lens at a second position;
         (3) computing a blur difference using the first blur quantity and the second blur quantity; and
         (4) generating the depth map from the blur difference;
      ii. configuring a parameter setting on the device based on the depth map, the parameter setting for acquiring an image with the image acquisition component;
      iii. implementing depth map thresholding including:
         (1) computing a histogram of the depth map using at least 256 bins;
         (2) computing the smoothed histogram by convolving the histogram with a Gaussian;
         (3) computing a first derivative of the smoothed histogram using central differences;
         (4) computing the local minima and maxima of the smoothed histogram by finding zero values in the first derivative;
         (5) computing a leftmost peak, a rightmost peak and a threshold;
         (6) if no threshold is found, then the scene does not contain an object of interest; and
         (7) if multiple threshold are found, the lowest threshold is selected and the scene is classified as containing the object of interest; and
   c. a processing component coupled to the memory, the processing component configured for processing the application.

18. The camera device of claim 17 wherein the depth map is generated using at least one of: range sensors integrated with the device, double-lens stereoscopic cameras, a single-lens camera with scanning focus area, a single-lens camera utilizing an approximate depth map, a single-lens camera moved horizontally, and a movable lens and an image sensor to acquire multiple images with different blur quantities.

19. The camera device of claim 17 wherein utilizing the depth map to configure the parameter setting includes at least one of configuring a zoom setting, configuring an aperture setting and configuring a shutter speed setting.

20. The camera device of claim 17 wherein the parameter setting is automatic zoom adjustment comprising:
   if the scene is classified as the landscape, incrementally zooming out of the scene and re-classifying the depth map to maintain a landscape classification and reach a widest available zoom setting;
   if the scene is classified as containing a main object, automatically zooming in on the object up to object boundaries of the scene;
   performing aperture adjustment;
   performing shutter speed adjustment; and
   updating a focus position.

* * * * *